Patented Nov. 25, 1947

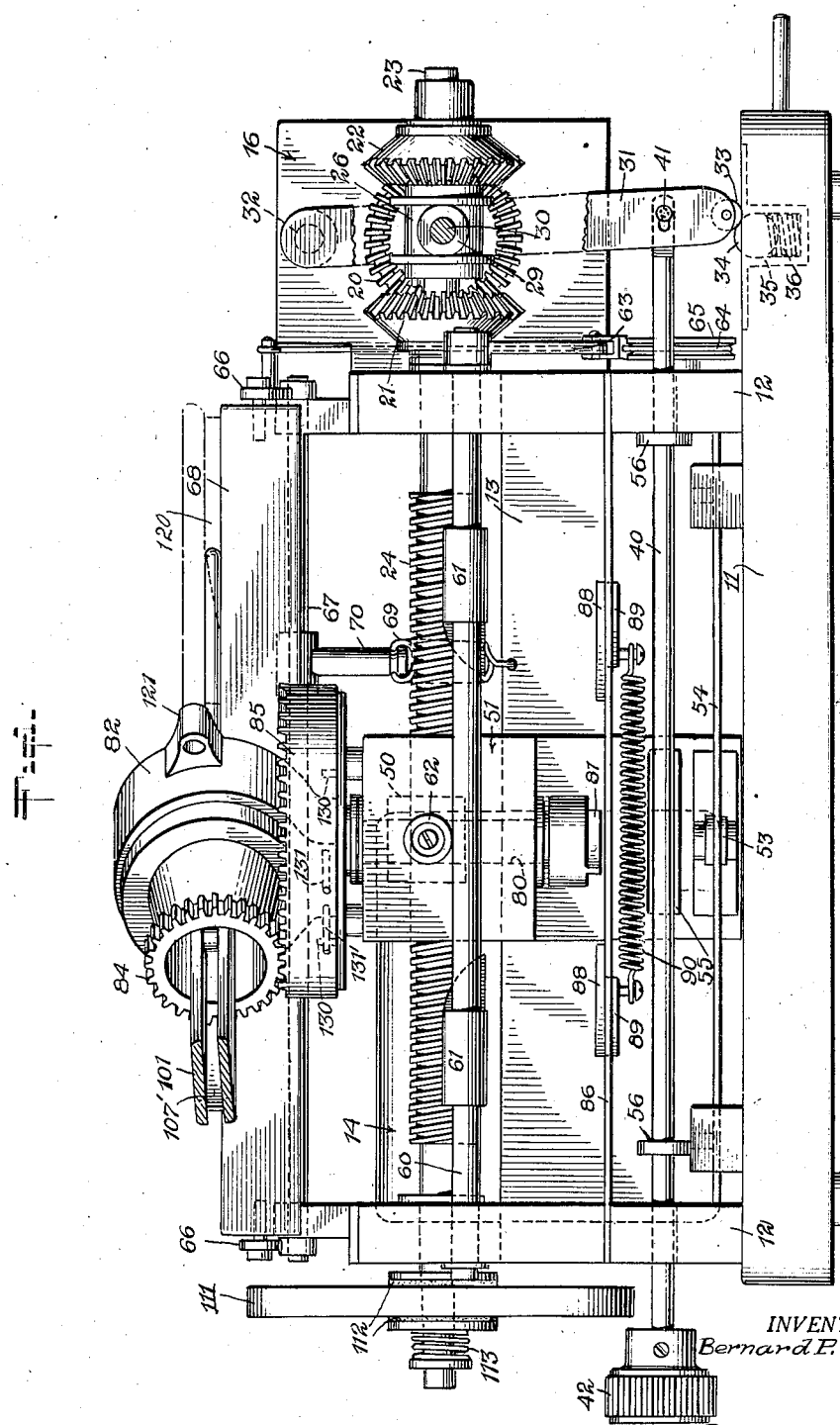

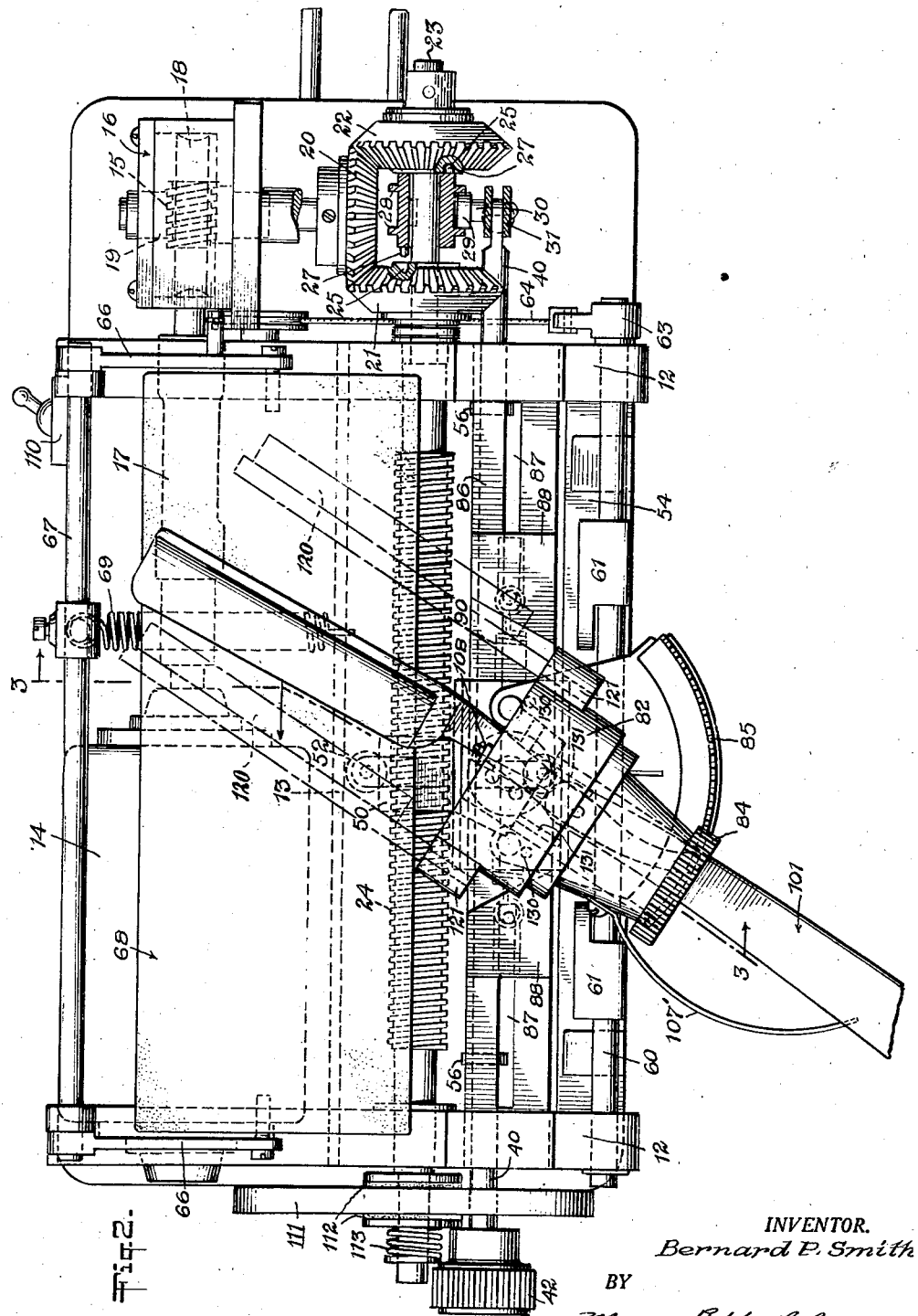

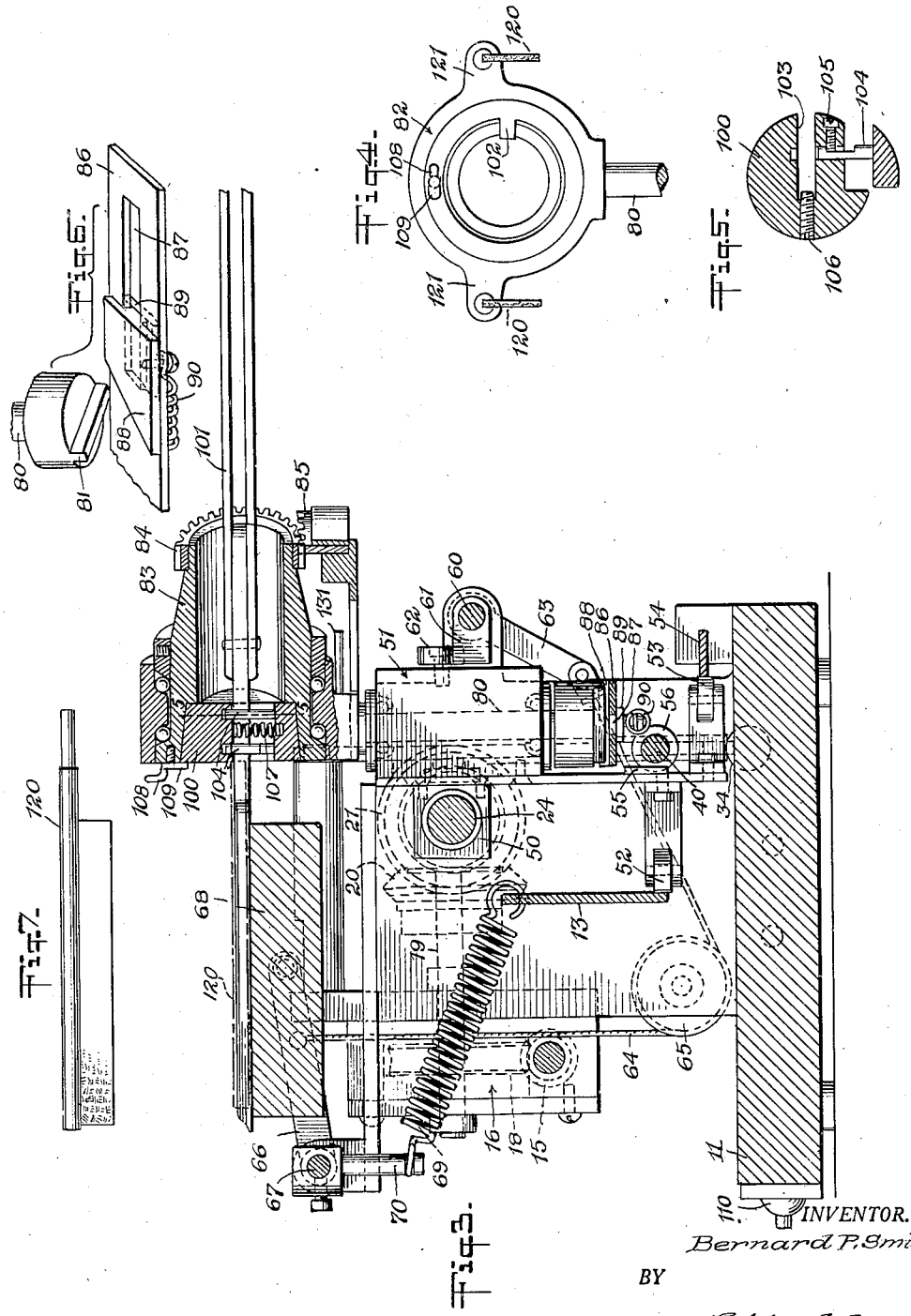

2,431,624

UNITED STATES PATENT OFFICE 2,431,624

HONING DEVICE FOR STRAIGHT RAZORS

Bernard P. Smith, Montville, N. J.

Application March 22, 1945, Serial No. 584,071

5 Claims. (Cl. 51—159)

This invention relates to a mechanical device for the honing of barbers' razors.

It is the object of the invention to provide a honing device which will mechanically hone barbers' razors to a finer pitch of perfection than highly skilled barbers are normally able to attain by hand.

This and other objects are attained by mechanism shown in the accompanying drawing in which—

Fig. 1 is a front view of the mechanism as a whole showing it in operating condition;

Fig. 2 is a top or plan view thereof;

Fig. 3 is a vertical section thereof on the line 3—3 of Fig. 2;

Fig. 4 is a face view of the razor holding housing or head showing a pair of wipers or oilers mounted therein;

Fig. 5 is a transverse section through the razor holding adapter on the line 5—5 of Fig. 3, showing the clamp member thereof in open position;

Fig. 6 is a fragmentary perspective view of part of the razor holder or head positioning mechanism; and Fig. 7 is a side view of one of the wipers or oilers shown in Fig. 4.

The device herein claimed is provided with a base 11 on which stands a frame comprising a pair of spaced upright members 12 and a vertical member 13 affixed at its opposite ends to said upright members. Carried by vertical member 13 is an electric motor 14 which is connected to a worm shaft 15 in gear box 16 by means of flexible coupling 17. A worm wheel 18 in said gear box mounted on a shaft 19 which extends outwardly from said gear box, is in mesh with the worm on said worm shaft. The outwardly extending end of shaft 19 carries a bevel gear 20 which is in permanent mesh with bevel gears 21 and 22, respectively. Bevel gears 21 and 22 are rotatably mounted on a shaft 23 which, in turn, is rotatably carried by upright members 12. In the space between said upright members, shaft 23 takes the form of a screw and this portion thereof is designated in the drawing with character reference 24.

It is clear from the description thus far set forth that when the motor 14 causes the bevel gear 20 to rotate, bevel gears 21 and 22 which are in mesh therewith are caused to rotate in opposite directions. It will be noted in Fig. 2 that bevel gears 21 and 22 are provided on their facing surfaces with small holes 25. It will also be seen in said figure that keyed to shaft 23 is a sleeve or clutch member 26 which is mounted on said shaft for longitudinal movement with respect thereto. Said sleeve or clutch member is provided at its ends with pins 27 which are adapted for insertion into holes 25 when in registration therewith. The sleeve or clutch member 26 is provided with a pair of spaced peripheral flanges 28 which form between them an annular channel or race. Carried within said race is a roller 29 mounted on a pin 30 which, in turn, is connected to a pivotally mounted lever or arm 31. Arm 31 is pivoted at its upper end by means of pin 32 to the gear box 16. Its lower end is provided with a roller 33 which is adapted to engage a ball 34 carried within a socket 35 in base 11. In Fig. 1 it will be seen that a compression spring 36 permanently urges ball 34 upwardly and that for roller 33 to pass, together with arm 31 on which it is mounted, from one side of ball 34 to the other, it is necessary for the roller to depress the ball against the action of the compression spring.

Ball 34 is situated on a perfectly vertical line which passes midway between gear wheels 21 and 22 and through pin 32. When arm 31 is held on said vertical line, clutch member 26 is held midway between bevel gears 21 and 22 by means of roller 29 which said arm carries. When the arm is pivoted to the right of ball 34 as is shown in Fig. 1, clutch member 26 is caused to move in the direction of bevel gear 22 and its pin 27 is caused to enter hole 25 in said bevel gear. Since the clutch member is keyed to shaft 23 and hence to the screw 24 which is integral with said shaft, said shaft and screw will be caused to rotate in the same direction that bevel gear 22 rotates. When arm 31 is pivoted to the left of ball 34, clutch member 26 is brought over in the direction of bevel gear 21, its pin 27 leaving hole 25 in bevel gear 22. At the same time, the oppositely situated pin 27 of clutch member 26 enters hole 25 in bevel gear 21 thereby causing shaft 23 and screw 24 to rotate in the same direction that bevel gear 21 is rotating. This direction is, of course, opposite the direction of rotation of bevel gear 22 and hence the clutch mechanism hereinabove described may be designated as the clutch and reversing mechanism of the device.

A rod 40, slidably mounted in upright members 12, is pivotally engaged at one end to arm 31 by means of pin 41 transversely fixed therein. A knob 42 carried at the opposite end of said rod is used to move said rod longitudinally in either direction thereby causing arm 31 to pivot in either direction as hereinabove described.

A traveling nut 50 mounted on a carriage 51 rides on screw shaft 24. The carriage 51 is prevented from engaging in pivotal movement around screw shaft 24 by means of a rear upper roller 52 and a front lower roller 53 which ride, respectively, against member 13 above mentioned and horizontal track or guide bar 54, the latter being affixed to the base 11. Affixed to the lower part of the carriage is a stop member 55 which is adapted to engage a pair of stop rings 56 carried by rod 40 between upright members 12. It is clear, therefore, that when the screw shaft is caused to rotate, the traveling nut will ride thereon, the direction of its travel depending on the direction of rotation of said screw shaft. Since the carriage and the traveling nut are affixed to each other, the carriage will travel with the traveling nut. When the carriage reaches either end of the screw shaft, the stop member 55 will engage the appropriate stop ring 56 thereby causing said stop ring and the rod 40 to which it is affixed to move in the direction in which the carriage is traveling. In the normal operation of the machine, the arm 31 will be situated on the right side of the ball 34 when the carriage travels toward the left, that is, in the direction away from said arm 31. Such being the case, when the stop member 55 on the moving carriage engages the left of the two stop rings 56, that ring together with the rod 40 to which it is affixed, move to the left pulling with them arm 31 until said arm approaches dead center. A flywheel hereinafter mentioned, now carries the arm 31 to slightly past dead center and the spring urged ball 34 carries it the rest of the way to the left. This causes the screw shaft to reverse its direction of rotation, thereby causing the traveling nut and hence the carriage to which it is affixed, to reverse their direction of movement and hence to move to the right. When the stop member 55 engages the right of the stop rings 56, the rod 40 and hence the arm 31 are caused to move to the right thereby effecting a reversal of direction of rotation, and therefore a reversal of movement of the traveling nut and carriage.

A shaft 60 is rotatably mounted in upright members 12 parallel in all respects to screw shaft 24. A pair of spaced cams 61 are affixed to said shaft 60. A roller 62 affixed to carriage 51 is adapted to engage said cams 61 and to cause them and the shaft on which they are mounted to rotate or pivot on the axis of said shaft. Affixed to one end of shaft 60 is a lever arm or crank 63 and affixed to said crank is one end of a flexible cable 64. The cable travels around a pulley 65 rotatably mounted on one of the upright members 12 and its other end is affixed to a second lever arm or crank 66. Crank 66 is fixedly mounted at one end on a rotatably mounted rod 67. Said crank is pivotally connected at its opposite end to one end of a honing stone 68, the cable 64 being attached to said crank at a point approximately midway between its two said pivotal connections. The stone 68 is provided at its opposite end with a similar construction, to wit, a crank 66 fixedly mounted on the same rod 67. It is obvious from this construction that when the carriage 51 moves in either direction in response to the rotation of screw shaft 24 and its roller 62 engages either of the cams 61, said engaged cam 61 together with shaft 60 will be caused to pivot downwardly around the axis of shaft 60 and thereby depress crank 63 whereby cable 64 is caused to depress crank 66. This obviously has the further effect of lowering honing stone 68. It will be noted that a tension spring 69 is affixed at one end to the member 13 and at its other end to a crank 70 adjustably fixed to rod 67. The lowering of the stone, therefore, takes place against the action of the tension spring 69 which tends, at all times, to maintain said stone in elevated position. It will be noted that the stone is thereby maintained in its elevated position at all times except when the carriage 51 is brought over to either end of screw shaft 24 sufficiently far so that roller 62 is in engagement with cams 61.

Rotatably mounted in carriage 51 is vertically disposed shaft 80 which is affixed at its lower end to a fin member 81 and at its upper end to a razor holder housing or head 82. Rotatably mounted in said housing 82 on a horizontal axis is a razor holder 83 which carries at one end a ring 84 provided with external gear teeth. These gear teeth are in constant mesh with curved rack gear 85 which is fixedly mounted on carriage 51. It will be appreciated that when shaft 80 is caused to rotate in carriage 51, the housing 82 will rotate with it on a common axis therewith and that simultaneously razor holder 83 will be caused to rotate on an axis perpendicular to the axis of rotation of said shaft 80 and housing 82 while at the same time engaging in rotary or pivotal movement around said axis of shaft 80 and housing 82.

An elongated plate 86 provided with a pair of spaced slots 87 is affixed to upright members 12. Slidably mounted on said plate are a pair of cam plates 88 which are provided with tongues 89 adapted to ride within said slots 87. A tension spring 90 joins the two sliding members and acts to keep them as close together as the slotted plate permits. Cam plates 88 have outwardly angular faces which engage and turn fin 81 of vertically disposed shaft 80. It will be noted that when the carriage 51 is caused to move either to the right or left as above described, the fin 81 strikes against either of the cam plates 88 and strives, in response to said contact, to rotate on the axis of the vertical shaft 80. The effort thus to rotate on the axis of vertical shaft 80 is, at first, weak but as the fin moves farther to the extreme right or left position, the cam plate with which contact is made more strongly resists movement in that direction by virtue of its connection to the tension spring 90. When the resistance of the cam plate 88 to further movement in the direction in which the fin 81 is traveling attains a predetermined degree, further movement of the cam plate wanes and ceases and the fin is caused to rotate as above described. Rotation of the fin and hence of the vertical shaft 80 has the effect, of course, of causing the housing 82 to rotate on the same axis and the holder 83 to rotate on an axis perpendicular to the axis of the vertical shaft 80 as well as to pivot around the axis of the vertical shaft 80.

Demountably carried within holder 83 is a tapered adapter 100 which carries the barber's or straight razor 101 intended to be honed. The adapter is keyed to the holder 83 by means of key 102 to prevent rotary movement of the adapter relative to the holder. It will be noted in Fig. 5 that the adapter is provided with a slot 103 which carries the shank of the razor and that a slidable clamp member 104 controlled by a set screw 105 frictionally holds the shank of the razor in place in said adapter. A stud screw 106 engages the back of the razor shank and holds it in place against the pins of slidable clamp member 104. The compression spring 107 normally urges said clamp member out of engagement with said razor shank. A locking screw 108 having an offset flange 109 locks the adapter in place in the holder 83 by means of said flange.

Reference to Figs. 1 and 2 will show that in the honing position of the razor, both the cutting edge and back simultaneously are held against the honing stone. The tension of spring 69 serves to maintain the stone in pressure contact with the razor and it will be understood that this contact serves to resist any rotary movement of the razor on its own longitudinal axis and hence it resists any rotary movement of the holder 83 on the same axis. Such being the case, and remembering that the gear ring 84 is in constant mesh with the curved rack gear 85, it will be understood that the pressure exerted by the stone upon the razor resists rotary movement of the housing 82 and the vertical shaft 80 as well as of the fin 81 on the vertical axis common to said latter members. It is thus the case that until the fin 81 brings either of the cam plates 88 over to the extreme right or left position, the resistance of the fin 81, shaft 80 and housing 82 against engagement in rotary movement is stronger than the resistance of the cam plate 88 to further movement either to the right or left. When, however, the cam plate in question reaches the extreme right or left position, the resistance thereof under the tension of spring 90 to further movement in that direction overwhelms the resistance of the fin 81, shaft 80 and housing 82 to rotary movement on the vertical axis mentioned. It is at this point that the stone is lowered in response to the action previously described. This lowering of the stone away from the razor lessens the resistance of the razor to rotary movement about its own longitudinal axis and the fin 81 and hence the shaft 80 and housing 82 are now free to rotate in response to the action of the cam plate upon said fin. To prevent the handle of the razor from flying about as the razor is thus caused to engage in the several movements described, a leaf spring 107' affixed to the holder 83 is made to engage said handle.

A preferred embodiment of the present invention has above been described and refinements and variations may be incorporated therein without departing from the basic principles thereof. Thus, for example, a toggle switch 110 is shown in Fig. 2 as controlling the electric circuit of the device. It is clear that any desirable type of electric switch may be substituted for this toggle switch. A fly wheel 111 is shown frictionally affixed to the free end of the screw shaft 24 by means of friction rings 112 and compression spring 113. It will be understood that the fly wheel may be affixed to the screw shaft in any conventional manner, the construction thus shown and described being intended solely for the purpose of taking up the shock of the abrupt reversals of direction of the screw shaft.

The machine operates as follows:

The razor is inserted into the adapter and the adapter into the holder as previously described. The razor is now in contact with the honing stone. The motor is started, and depending on whether arm 31 is to the right or left of ball 34, the screw shaft will be caused to rotate in one or the other direction. This, naturally, has the effect of causing the carriage to move either to the left or to the right and with it the housing 82, the holder 83 and the razor. As the blade of the razor is moved across the stone, the honing operation takes place. To facilitate it, a pair of wipers or oilers 120 carried within apertured bosses 121 on housing 82, oil and clean the stone in accordance with accepted principles. When the carriage approaches its extreme position either on the right or left, the stone drops and the fin 81, shaft 80 and housing 82 are caused to rotate on their vertical axes thereby causing the holder 83 to rotate on its axis and the razor to turn over. Simultaneously, the direction of the rotation of the screw shaft is reversed and the carriage is caused to move in the opposite direction. The stone is now raised until contact is made with the back of the razor blade, the cutting edge of the blade being not yet in contact with the stone. As the carriage continues to move in the last mentioned direction, the pressure exerted by the stone upon the back of the razor tends to pivot the razor on its longitudinal axis against the resistance to such movement caused by the tight contact of the cam plate in question against the face of the fin 81. As the carriage continues to move in said direction, the fin is released by the cam plate and rotation thereof and of the shaft 80 and housing 82 is again permitted. Such being the case, the razor is now free to rotate on its own longitudinal axis in response to the pressure exerted upon the back of the blade thereof. The cutting edge of the razor is now brought into contact with the stone once more and as the blade is carried across the face of the stone, the honing operation continues.

It will be noted that there is no danger of the ring gear 84 overriding the curved rack gear 85 during the operation of the machine since during the course of the honing stroke the close contact of the razor against the stone prevents movement of the ring gear relative to the rack gear and at the beginning and end of each stroke the close contact of the fin 81 against either of the cam plates 88 also prevents such relative movement. When the machine is not in use, however, and no razor is mounted therein, overriding of the curved rack gear does become possible and it is to prevent this from happening that stop pins 130 on the carriage and pins 131 on the housing are provided, said pins being adapted to engage each other when the ring gear approaches the ends of the rack gear.

I claim:

1. In a machine for honing barbers' razors, a frame, a razor carrier supported by said frame, means adapting said carrier for horizontal movement on said frame, a honing stone also supported by said frame, means adapting said honing stone for vertical movement on said frame, tension means moving said stone into tensional honing contact with the razor, means moving said razor carrier along the stone whereby the razor is carried across the stone for the honing stroke, cam means moving the stone, against the action of the tension means, out of contact with the razor to end the honing stroke, means reversing the position of the razor with respect to the stone in preparation for the succeeding honing stroke, and means moving the razor carrier back along the stone whereby the razor is carried across the stone for said succeeding honing stroke.

2. A machine for honing barbers' razors comprising a frame, a razor carrier supported by said frame, means adapting said carrier for horizontal movement on said frame, a shaft mounted in said carrier for rotation on a vertical axis, a razor holder mounted on said shaft for rotation on a horizontal axis, a honing stone, a support for said honing stone pivotally mounted on said frame whereby said stone may be moved upwardly and downwardly, a tension means moving said stone into tensioned honing contact with a razor carried by the razor holder to begin the honing stroke, a motor driven screw engaging said carrier for movement laterally of the honing stone while the razor is in honing contact therewith, cam means connected to the honing stone and means on said carrier to engage and actuate said cam means to end the honing stroke by moving the stone out of contact with the razor, additional cam means engaging the vertical shaft and causing partial rotation thereof, gear means on razor holder in mesh with gear means on movable carrier whereby partial rotation of the vertical shaft also causes partial rotation of the razor holder resulting in reversal of angle and face of the razor with respect to the stone in preparation for the succeeding honing stroke, and reversing means including a clutch and a pair of oppositely rotating gear wheels reversing the direction of travel of the carrier and hence of the razor with respect to the stone by reversing the direction of rotation of the screw.

3. In a machine for honing barbers' razors, a frame, a razor carrier supported by said frame, means adapting said carrier to move on a given plane on said frame whereby said carrier is adapted to move a razor on a given plane, said honing member mounted for movement toward and away from said plane, means moving said honing member toward said plane into honing engagement with said razor and holding said honing member in such engagement therewith while the carrier moves the razor along said plane and across said honing member, and means withdrawing said honing member from contact with said razor.

4. In a machine for honing barbers' razors, a frame, a razor carrier supported by said frame, means adapting said carrier for movement back and forth along a given plane, whereby said carrier is adapted to move a razor back and forth on said given plane, a honing member also supported by said frame, means adapting said honing member for movement toward and away from said plane, means moving said honing member toward said plane and into honing engagement with said razor at the beginning of each stroke, and moving said honing member away from said plane and out of engagement with said razor at the end of each said stroke and means reversing the position of the razor on said carrier relative to said honing member between strokes.

5. In a machine for honing barbers' razors, a frame, a razor carrier supported by said frame, means adapting said carrier for movement back and forth on a horizontal plane on said frame, whereby said carrier is adapted to move a razor back and forth on a horizontal plane, a honing member also supported by said frame, means adapting said honing member to move vertically on said frame, means moving said honing member into honing engagement with said razor at the beginning of each stroke of the razor and holding said honing member in such engagement during the course of said stroke, means moving said honing member out of engagement with said razor at the end of each said stroke, and means reversing the position of the razor relative to the honing member before the beginning of each succeeding stroke of the razor.

BERNARD P. SMITH.

REFERENCES CITED

The following references are of record in the file of this patent:

UNITED STATES PATENTS

| Number | Name | Date |
|---|---|---|
| 498,662 | Knight | May 30, 1893 |
| 584,626 | Curley | June 15, 1897 |
| 630,106 | Purdy | Aug. 1, 1899 |
| 660,640 | Kampfe | Oct. 30, 1900 |
| 1,133,256 | Boerner | Mar. 30, 1915 |
| 1,425,798 | Sheehan | Aug. 15, 1922 |
| 1,441,392 | Bastian | Jan. 9, 1923 |